(12) United States Patent
Yianilos et al.

(10) Patent No.: US 7,107,263 B2
(45) Date of Patent: Sep. 12, 2006

(54) MULTISTAGE INTELLIGENT DATABASE SEARCH METHOD

(75) Inventors: Peter N. Yianilos, Princeton, NJ (US); Kirk G. Kanzelberger, Seattle, WA (US)

(73) Assignee: Netrics.com, Inc., Princeton, NJ (US)

( * ) Notice: Subject to any disclaimer, the term of this patent is extended or adjusted under 35 U.S.C. 154(b) by 585 days.

(21) Appl. No.: 10/432,791

(22) PCT Filed: Dec. 8, 2000

(86) PCT No.: PCT/US00/33422

§ 371 (c)(1),
(2), (4) Date: May 22, 2003

(87) PCT Pub. No.: WO02/46965

PCT Pub. Date: Jun. 13, 2002

(65) Prior Publication Data

US 2004/0059731 A1    Mar. 25, 2004

(51) Int. Cl.
*G06F 17/30* (2006.01)

(52) U.S. Cl. .................. 707/3; 707/4; 707/5

(58) Field of Classification Search .............. None
See application file for complete search history.

(56) References Cited

U.S. PATENT DOCUMENTS

| 5,841,958 A | 11/1998 | Buss et al. .............. 345/440 |
| 5,978,797 A | 11/1999 | Yianilos .................... 707/3 |

*Primary Examiner*—Uyen Le
(74) *Attorney, Agent, or Firm*—Pattric J. Rawlins; Procopio Cory Hargreaves & Savitch LLP

(57) ABSTRACT

An improved multistage intelligent database search method includes (1) a prefilter that uses a precomputed index to compute a list of most "promising" records that serves as input to the original multistage search method, resulting in dramatically faster response time; (2) a revised polygraph weighting scheme correcting an erroneous weighting scheme in the original method; (3) a method for providing visualization of character matching strength to users using the bipartite graphs computed by the multistage method; (4) a technique for complementing direct search of textual data with search of a phonetic version of the same data, in such a way that the results can be combined; and (5) several smaller improvements that further refine search quality, deal more effectively with multilingual data and Asian character sets, and make the multistage method a practical and more efficient technique for searching document repositories.

17 Claims, 16 Drawing Sheets

Search results for query "Swiictzerlnd"

1. Switzerland
2. swipnet
3. Sunderland
4. Swine
5. Swiss
6. Witwatersrand
7. Netherlands
8. Saarland
9. Clermont-Ferrand
10. Fredericton
11. Ostersund
12. Richland
13. Iceland
14. Scotland
15. Brunswick
16. Zealand
17. Deutschland
18. Richmond
19. mdc-berlin
20. Ipswich

Figure 4A

Search results for query "usurpatin juditial of politcs"

1. Charter of Rights and Freedoms which serves, mutatis mutandis, much as the Constitution does in U.S. law, with the additional difficulty that it is the creation of the very lawyers who have the responsibility of interpreting it. This invites an even more flagrant "judicial usurpation of politics," as is evident in the flat assertion of Canadian courts that "Charter values" trump both social tradition and the express will of the majority of the people. These questions are addressed by a Canadian 2. should not set the boundaries of political discussion. Indeed, acquiescence in judicial usurpation, far from warding off extremism, would likely increase the number of Americans who believe there is no alternative to violent change. We therefore call for the vigorous pursuit of every peaceful and constitutional means to return our country to its democratic heritage, and to encourage its people to take up again what Professor Glendon calls the hard work of being citizens rather than subjects.

3. judicial usurpation of politics is about. But I am most grateful to Mr. O?Sullivan for bringing to my attention Samuel Butler?s observation that "those who scorn respectability as a tepid imitation of real virtue usually turn out to be the same people who cannot meet its unexacting demands." (The New Criterion series has been anthologized in a new book, The Betrayal of Liberalism: How the Disciplines of Freedom and Equality Helped Foster the Illiberal Politics of Coercion and Control, edited by 4. Many important issues are raised in the symposium, two above all: the condition of the courts and the condition of the people. Most of the concerns expressed in the symposium were directed at the judicial usurpation of politics, and I understand why. If the Supreme Court and the Federal District Courts were acting in a responsible fashion, near- apocalyptic language would not make its way onto the pages of First Things.

5. stone-faced associates, showed up in our office and informed the five of us on staff that we had two hours to gather our belongings and vacate the premises. (You can learn the sordid details by consulting back issues of the New York Times and assorted journals of opinion, as well as RJN?s essay on the subject in The End of Democracy? The Judicial Usurpation of Politics, Mitchell S. Muncy, ed. [Spence, 1997].) We were, as you might expect, thoroughly stunned: the best I could come up with in

Figure 4B

Q:      APPLY

R1:     [APPL]E

R2:     [APPLY]ING  ⟶  Y
                       LY
                       PLY
                       PPLY
                       APPLY

Figure 5A

Q:      Vodaphone

R1:     Cana[da]  Pay[phone]  C[o]rp. | [V]A

R2:     [Voda]f[one]  AirTouc[h] [P]LC | NY

Figure 5B

MULTISTAGE INTELLIGENT DATABASE SEARCH METHOD

BACKGROUND OF THE INVENTION

1. Field of the Invention

This invention relates to methods of database searching, and more particularly to improvements to a highly error-tolerant yet time-efficient search method based on bipartite weighted matching.

2. Description of Related Art

Inexact or "fuzzy" string comparison methods based on bipartite matching are highly appropriate for finding matches to users' queries in a database, despite errors and irregularities that often occur in both queries and database records. Given the massive growth in both the quantity and availability of information on the world Internet, and the dependence of corporations, government agencies, and other institutions on accurate information retrieval, a pressing need exists for efficient database search methods that are highly error-tolerant, and that also function well on the vast quantity of "semi-structured" (loosely formatted) textual data that is available to users of the Internet and corporate intranets.

Such an error-tolerant database search method is the subject of U.S. Pat. No. 5,978,797 by Peter N. Yianilos, assigned to NEC Corporation, Inc., entitled "Multistage Intelligent String Comparison Method." The heart of that invention is a software function that compares two text strings, and returns a numerical indication of their similarity. To approximate a more "human" notion of similarity than other approaches to inexact comparison, this function utilizes a bipartite matching method to compute a measure of similarity between the two strings. String comparison using bipartite matching is disclosed in U.S. Pat. No. 5,841,958 by Samuel R. Buss and Peter N. Yianilos, assigned to NEC Corporation, Inc. U.S. Pat. No. 5,978,797 discloses the application of bipartite matching-based string comparison to database search, in which the similarity of each database string to a query is computed based on an optimal weighted bipartite matching of characters and polygraphs (short contiguous stretches of characters) common to both database record and query.

This "multistage" search method operates on a database consisting of records, each of which is viewed simply as a string characters, and compares each record with a query consisting of a simple free-form expression of what the user is looking for. The comparison process occurs in three stages, in which the earlier stages are the most time-efficient and eliminate many database records from further consideration. The final output is a list of database records ranked by their numerical "similarity" to the query. The multistage approach, which applies increasingly stringent and computationally intensive versions of bipartite matching to smaller and smaller sets of records, makes it possible to compare the query with thousands or hundreds of thousands of database records while still delivering acceptable response time. The result is that in almost all cases, the output list of database records is the same list that would be produced by applying the final and most discerning (but slowest) process stage to the entire database.

A number of weaknesses and unexploited potentialities are associated with the original multistage database search method disclosed in U.S. Pat. No. 5,978,797:

ORIGINAL METHOD WAS NOT SCALABLE TO LARGE DATABASES. A major weakness of the original method is that it must examine every character of every record in a database in order to determine a list of records most similar to a query. The original method is thus time-efficient only for small to medium-sized databases, consisting of tens or hundreds of thousands of records. The method is not scalable to large databases.

ORIGINAL METHOD DID NOT TAKE ADVANTAGE OF THE BIPARTITE GRAPH TO PROVIDE VISUAL FEEDBACK TO THE USER. The original method used the total cost of the bipartite matching of characters and polygraphs between query and database record as a measure of their similarity. This is a single number, which suffices for the ranking of records in the output list. However, the bipartite graph that is computed by the final filter stage contains information that can be used to provide sophisticated feedback to the user regarding the "matching strength" of each character in a database record.

ORIGINAL METHOD WRONGLY WEIGHTED MATCHING POLYGRAPHS OF DIFFERENT LENGTHS. The three stages of the multistage method compute bipartite matchings of single characters and polygraphs common to a query and a database record. Since a matching 6-graph (stretch of 6 characters) is clearly more significant than a matching 3-graph or 2-graph or 1-graph (single character), the original method adopted a weighting scheme that weighted matching polygraphs in direct proportion to their length. This approach was mistaken, and frequently resulted in a poor similarity ranking.

A more correct analysis of bipartite matching of polygraphs shows that longer polygraphs naturally receive greater weight in the overall matching due to the greater number of shorter polygraphs they contain, which are also included in the matching.

This natural weighting effect due to polygraph inclusion is already so pronounced that a correct weighting scheme should seek to attenuate it, not further magnify it, as did the original method. Under the original weighting scheme, database records containing many short matching polygraphs but no very long ones, tended to be strongly outranked by records that happened to contain a single long matching polygraph. This frequently resulted in clearly less-similar records (in the judgment of a human being) outranking more-similar records.

ORIGINAL METHOD INCORPORATED NO KNOWLEDGE OF CHARACTER PHONETICS. Bipartite matching operating directly on English or other natural-language strings does not capture points of similarity that depend upon knowledge of character phonetics, e.g., that in English "ph" usually represents the same sound as "f". While a typographic error in a query or database record generally substitutes an unrelated symbol for the correct one, misspellings often substitute a symbol (or symbols) that sound equivalent to the correct symbol. The original method incorporated no such language-specific phonetic knowledge, which frequently resulted in degraded search quality.

In summary, the original multistage search method does not scale to large databases, does not exploit the bipartite graph to provide any visual feedback to the user on which characters match his query, employed a faulty character and polygraph weighting scheme, and does not capture points of similarity with a query that depend on a knowledge of phonetics.

SUMMARY OF THE INVENTION

Briefly described, the invention comprises the following elements:

A "polygraph indexing prefilter" which serves as a front-end filter to the multistage search method. This prefilter operates using a precomputed index of all polygraphs of some single fixed length N (generally 3 or 4) that occur in the database. For each of these N-graphs, the index maintains a precomputed list of all records containing that polygraph.

When the user submits a search query, this query is resolved by the filter into the list of unique N-graphs that it contains. Using the precomputed index, the prefilter quickly determines a list of records sharing one or more N-graphs with the query. A maximum list size $M_r$ (often about 5,000 records) is enforced, and since the prefilter keeps track of exactly how many N-graphs in each record are held in common with the query, it is able to return what are in effect the $M_r$ most "promising" records.

This list of (at most) $M_r$ records, normally a very small fraction of the whole database, then serves as input to the three stages of the original multistage search method. Since the prefilter does not actually examine any record, its operation is much faster than the later stages, each of which must examine every character of every input record.

The effect of this element of the invention is to make the multistage method scalable to databases considerably larger than before—typically millions or tens of millions of records.

Visualization of the matching strength of each character in the database records output by the multistage search method, using information contained in the bipartite graph matching characters and polygraphs in the database record and the query. Briefly, each character in an output record is by definition contained in zero or more polygraphs that are matched with polygraphs in the query. The lengths of such containing polygraphs, as well as their graph edge displacements, provide the basis for a quantitative measure of "matching strength" at that character position. The preferred embodiment uses the lengths of matching polygraphs containing each character position to determine an integral matching strength for each character in an output record. When the record is displayed to the user, each of its characters is highlighted in proportion to this matching strength using font-based highlighting techniques, including but not necessarily limited to font color, type size, type style, and underlining.

A revised scheme for weighting matching polygraphs in the multistage search method. The scheme used by the original method was wrong. The revised scheme weights each matching polygraph in inverse proportion to its length, thus attenuating but not wholly canceling the naturally greater weight (due to polygraph inclusion) of the longer polygraphs. The weighting factor used is the polygraph length raised to an exponent (typically negative). This exponent is a tunable parameter. Appropriate values for textual data are typically in the range −0.5 to −1.0.

A technique for complementing the direct application of the multistage method to textual data with a parallel application of the same method to an alternative (e.g., phonetic) representation of the same data. Thus, given a search query, two multistage searches are performed: one search with the given query against the untransformed database, and a second search with an alternative version of the query against a transformed version of the same database (e.g., a phonetic transcription of the query searched against a phonetically transcribed version of the database). A simple form of normalization ensures that the results of the two searches are comparable, and can be directly merged. If a record occurs in the output of both searches, the higher-scoring (more similar) occurrence determines the record's rank in the merged output list. In this way, a multistage search that handles typographic errors efficiently is complemented by a search that handles phonetic misspellings efficiently. The result is a significantly enhanced multistage search.

In addition, the invention comprises a number of smaller improvements that further refine search quality, deal more effectively with multilingual data and Asian character sets, and make the multistage method a practical device for searching document repositories.

The invention may be more fully understood by reference to the following drawings.

BRIEF DESCRIPTION OF THE DRAWINGS

FIG. 4A illustrates match strength visualization using font-based highlighting techniques on a list of words.

FIG. 4B illustrates match strength visualization using font-based highlighting techniques on a list of paragraphs.

FIG. 5A illustrates the additional matching polygraphs present when a matching character stretch is increased in length by one character.

FIG. 5B illustrates an example of poor match ranking when there is no attenuation of the weighting of long polygraphs due to polygraph inclusion.

DETAILED DESCRIPTION OF THE INVENTION

During the course of this description like numbers will be used to identify like elements according to the different figures that illustrate the invention.

Figure 1:
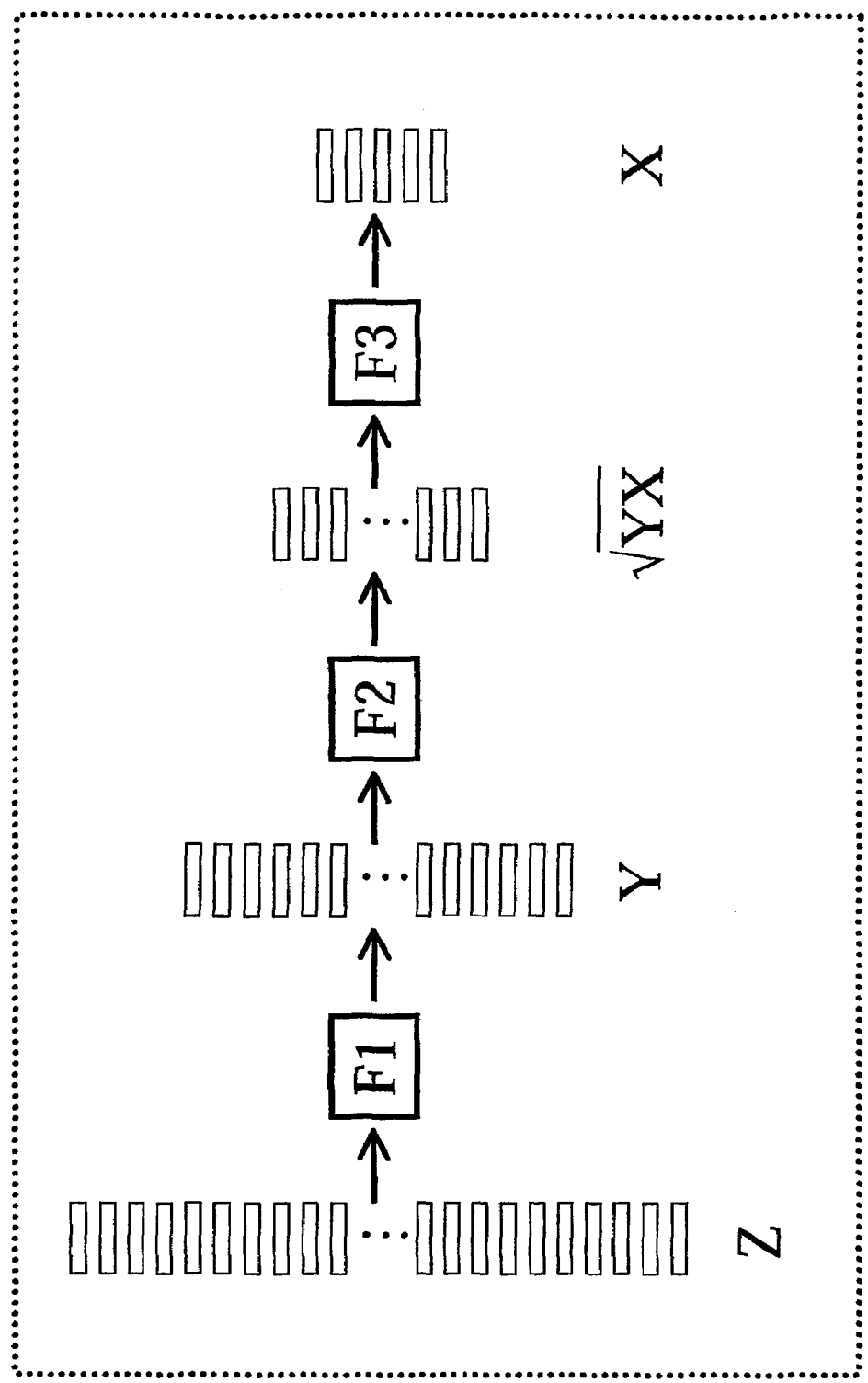
FIG. 1 illustrates the prior art.

FIG. 1 is a schematic illustration of the prior art disclosed in U.S. Pat. No. 5,978,797.

Figure 2:
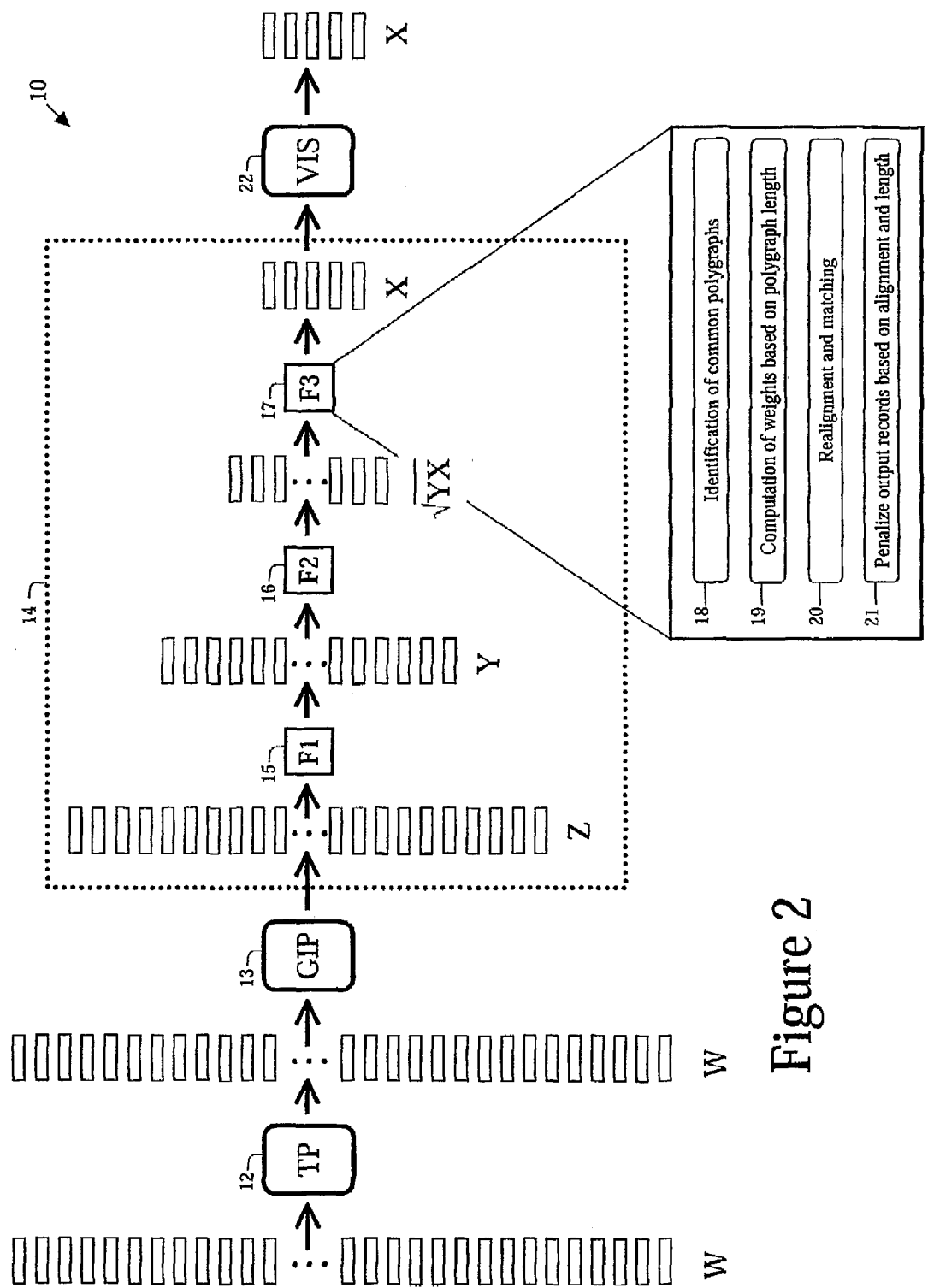
FIG. 2 illustrates the preferred embodiment of the present invention.

FIG. 2 is a schematic illustration of the preferred embodiment 10 of the present invention. A transductive preprocessor 12 prepares a searchable version of the text of W database records. These are input to a polygraph indexing prefilter 13, or "GIP prefilter," which serves as a front-end to the three filter stages F1, F2, and F3 comprising the original multistage method 14. These four filters, including the GIP prefilter, comprise a time-tapered sequence of filter stages, where the input of each filter is a set of database records, and the output is a subset of its input. The output of a filter is the input of the next filter in the sequence. Each filter applies a more stringent computation of "similarity" than the previous filter between the query and its input. Earlier filter stages are fastest and eliminate the greatest number of records from further consideration. Later stages are the most computationally intensive, but operate on much smaller subsets of records.

When a search query is submitted by a user, the largest set of W records is input to the GIP prefilter, which outputs Z records, where Z is normally a small fraction of W. The F1, F2, and F3 filters reduce the number of records to a final output list of X most-similar records, ranked by their degree of similarity to the query. The result of this tapered filters approach is that the final output list of X records is in almost all cases the same as would be produced by applying the final, most discerning (but slow) filter stage, F3, to the entire database of W records.

The F1 15 and F2 16 filter stages of the present invention are as in the prior art. In the preferred embodiment, F1 takes account only of counts of matching polygraphs, and F2 performs a bipartite matching with a "free" realignment, as disclosed in U.S. Pat. No. 5,978,797.

The F3 filter stage 17 is as in the prior art as to its basic steps, but some of these steps incorporate significant improvements in the present invention. Polygraphs common to query and record are identified as in the prior art 18. The computation of polygraph weights 19 corrects a major deficiency, a revised realignment process 20 addresses a frequent source of search failure, and the addition of alignment and record-length penalties 21 produces a more natural ranking of records that have essentially the same degree of similarity to the query.

Finally, a visualization postprocessor 22 computes a match strength for every character in the X output records using information contained in the bipartite graphs computed by F3, and displays the records with characters highlighted in proportion to their match strength.

(1) Polygraph Indexing Prefilter

The three filters F1, F2, and F3 examine every character of every record in their input. If the entire database is input to F1, then every character in the database will be examined in the course of every search. For this reason, the original method was time-efficient only for small and medium-sized databases (up to tens or hundreds of thousands of records, depending on record length). The purpose of the additional GIP prefilter is to make the multistage method scalable to larger databases containing millions or tens of millions of records.

Figure 3A:
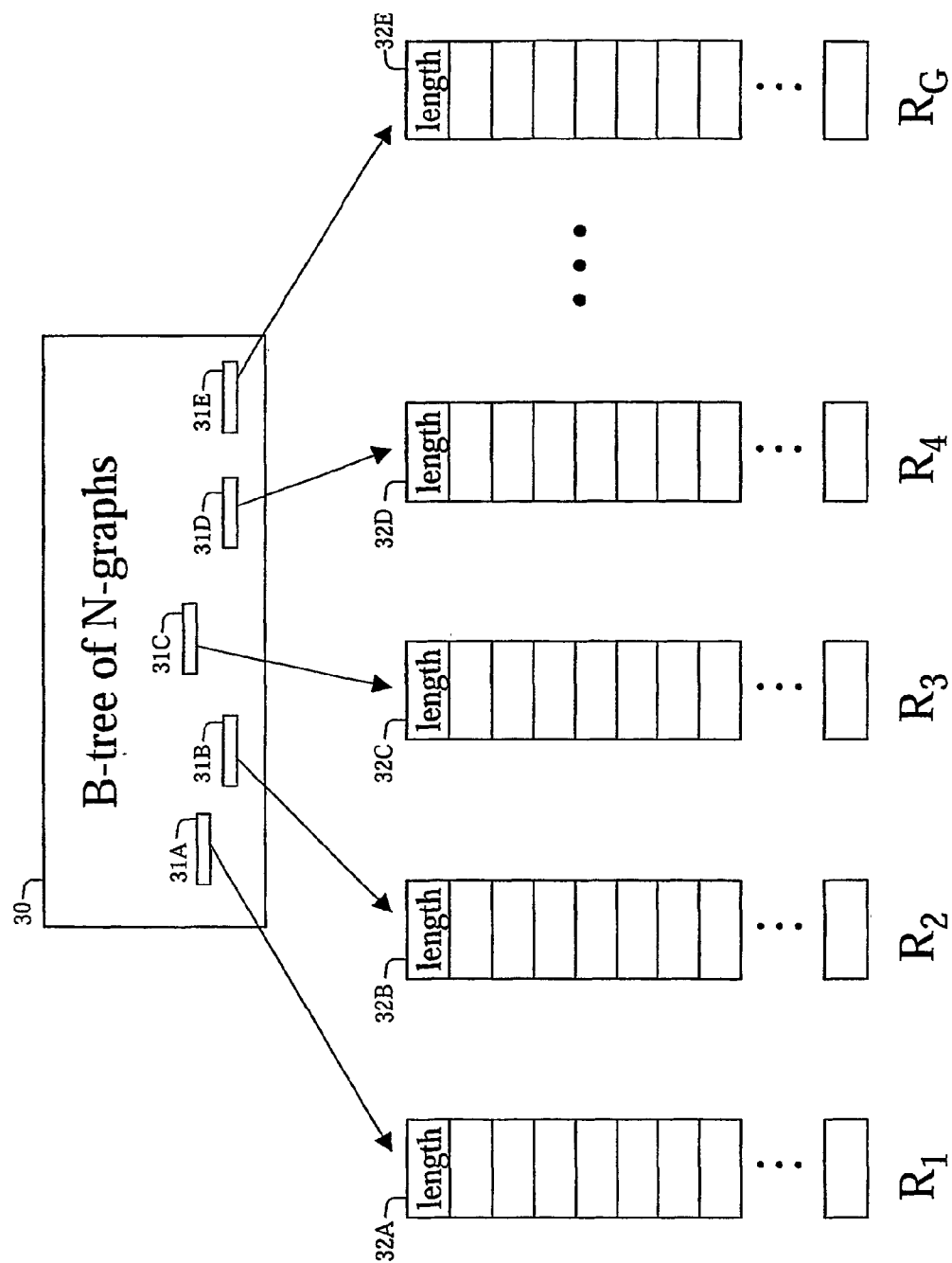
FIG. 3A is a schematic illustration of the static data structures used by the GIP prefilter.

FIG. 3A illustrates the data structures used by the GIP prefilter to reduce the complete set of database records to a list of typically several thousand most "promising" records. Let N be a fixed value, typically either 3 or 4. Every N-graph $g_i$ of the G unique N-graphs occurring in the database is stored in a B-tree 30, together with a pointer 31 to a list $R_i$ 32 of all records in the database that contain N-graph $g_i$. The length of each list $l_i$ is explicitly stored with the list for ease of access.

Generally speaking, record lists for the most common N-graphs in a database are not useful for determining the most promising records, especially when an N-graph occurs in the vast majority of database records. Hence, in the preferred embodiment, record lists are not actually built for N-graphs occurring in more than 75 to 80 percent of the records in the database. The B-tree pointer for such an N-graph contains a flag indicating that its frequency exceeds the chosen threshold.

These data structures of FIG. 3A are precomputed, and can be large. Hence the GIP prefilter is employed under circumstances where the need for speed in searching a large database warrants the increase in memory utilization.

Figure 3B:
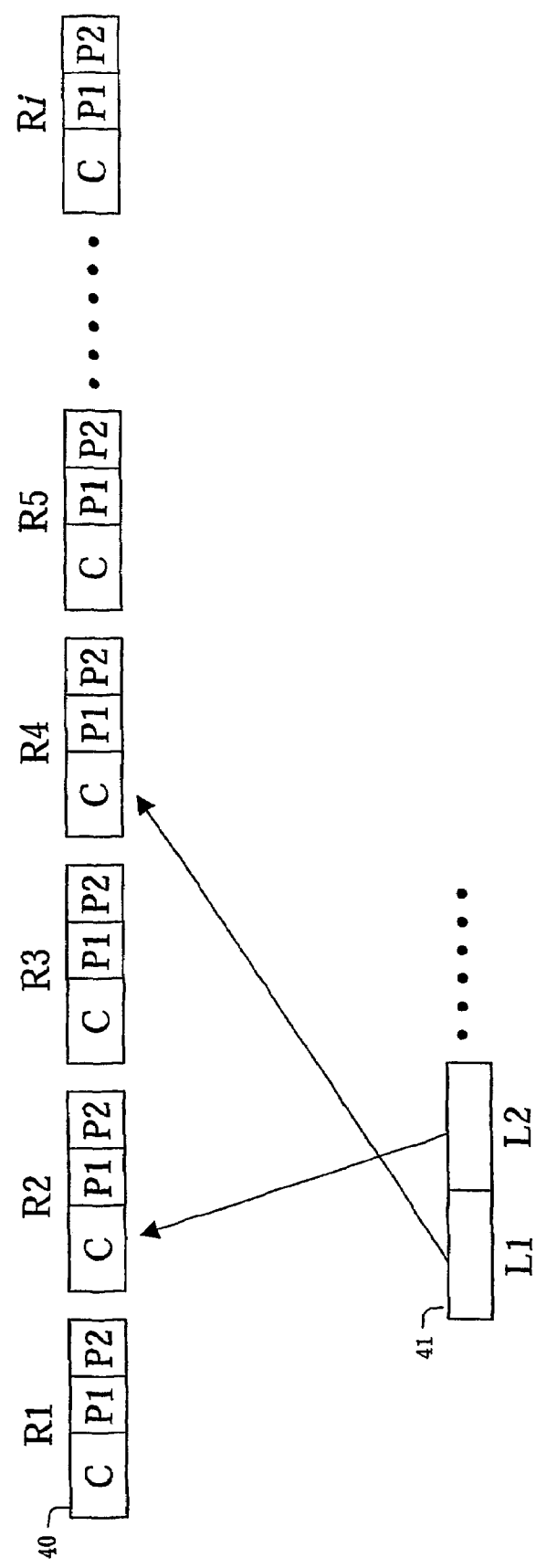
FIG. 3B is a schematic illustration of the dynamic data structures used by the GIP prefilter.

FIG. 3B depicts the key search-time data structure used by the prefilter. It is a table 40 containing an entry for each record in the database, where each entry comprises three elements: an integer counter C, a forward pointer P1, and a backward pointer P2. The counter will count the number of distinct N-graphs each record shares with a query Q. The pointer elements enable table entries to be linked to each other in doubly linked lists. A dynamically expanding vector 41 is used to store the heads of such doubly linked lists $L_1$, $L_2$, $L_3$, ..., after they are created. Each record's table entry will be on at most one such doubly linked list at any given time.

Figure 3C:
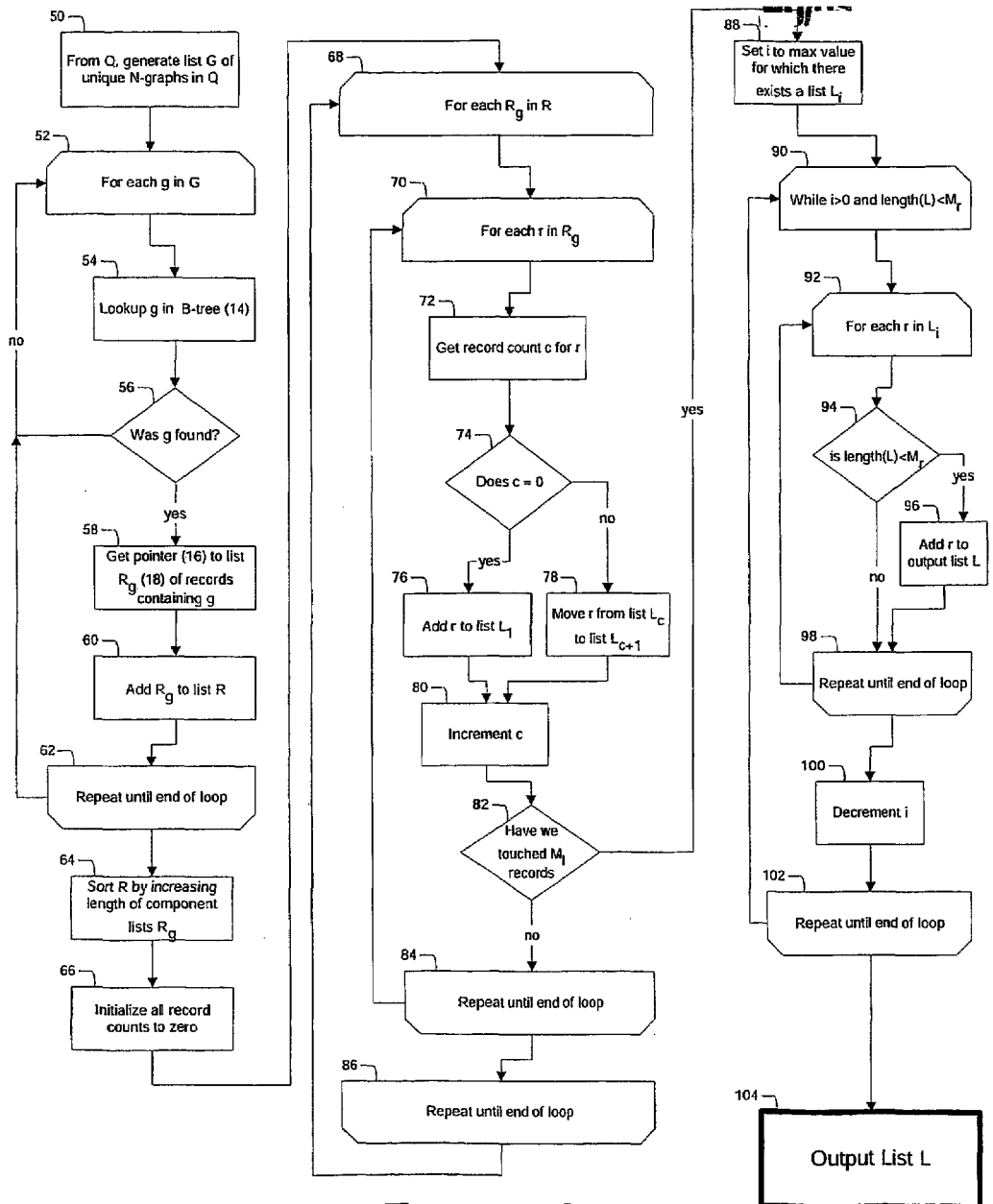
FIG. 3C is a flowchart of the operation of the GIP prefilter.

FIG. 3C gives a flowchart of the operation of the GIP prefilter. The prefilter is invoked with three input parameters: a search query Q, a maximum number $M_l$ of list items to traverse, and a maximum number $M_r$ of records that are to be output by the prefilter. (Typical values for $M_l$ and $M_r$ are 10,000 records and 5,000 records, respectively.)

A query Q is resolved into a list G of its unique N-graphs 50. For unique each N-graph g in the query 52, the prefilter tries to look up g in the B-tree 54. If g is in the B-tree 56, the B-tree delivers the pointer to its associated record list $R_g$ 58. The pointer to $R_g$ is added to a list R of "relevant" record lists 60. (If the B-tree contains a flag value indicating that the N-graph was too common to have a record list, the N-graph is ignored.)

After the list R of relevant record lists is complete 62, R is sorted by increasing length of its component lists $R_g$ 64. That is, the shortest record lists will be at the beginning of R, and the longest at the end of R. The point of sorting R is that the shortest record lists correspond to the least common, and hence most potentially significant, N-graphs that are held in common with the query. The prefilter will therefore traverse the record lists in order of increasing list length.

The prefilter now initializes the integer counters 66 for each database record in the table 40. Also, all pointers in the table are set to a null value.

The lists in R are now linearly traversed in order (shortest lists first) 68. For each record in each list 70, the associated counter value c is retrieved 72 and tested 74. If the counter value is zero, i.e., if this is the first time this record has been encountered on a list, the record is added to doubly-linked list $L_1$ (which is created if necessary) 76. The list $L_1$ is the list of records that have been encountered exactly once by the prefilter.

If the counter value c is not zero, then this record has been encountered exactly c times before, and is on doubly linked list $L_c$. It is removed from list $L_c$ and inserted into list $L_c+1$ (which is created if necessary) 78. List removal and insertion are fast, since the list item for a given record is quickly found in the table 40, which is indexed by record.

The counter c in the table 40 is now incremented 80.

After processing each record on a record list, the prefilter checks to see if it has traversed $M_l$ records 82. If so, it exits the record list traversal loops.

After record list traversal is complete 84,86, the prefilter builds its output record list L from lists $L_i$, starting with the list with the maximum value of i 88. Thus it outputs first those records containing the most distinct N-graphs in common with the query. It proceeds until either the lists $L_i$ are exhausted or the maximum $M_r$ of output records is reached 90. For each record in a list 92, as long as the maximum $M_r$ is not exceeded 94, the record is added to the output list L 96. When the list is exhausted 98, the prefilter decrements i 100 and processes the next list $L_i$. When the lists are exhausted or the maximum $M_r$ is reached 102, the list L is output 104. The output list L of the GIP prefilter is a list of the (at most) $M_r$ "most promising" records. These records alone are passed to the F1 filter.

The advantage of the GIP prefilter is that a large database of W records is reduced very quickly to a most promising subset of Z records, typically several thousand. This prefilter is fast because it essentially retrieves precomputed lists of records. The result is that, for any particular search query, the bulk of a large database need not be traversed by the later filter stages that must examine every character of every input record.

It should be understood that what is claimed here is a polygraph indexing method used as a prefilter for the multistage database search method, and not as the primary search engine.

(2) Visual Feedback Based on Bipartite Graphs

FIGS. 4A and 4B illustrate the visualization of per-character match strengths using font-based highlighting techniques. In these examples, type size and emboldening are used to indicate the relative match strength of each character in each displayed database record. Other typical techniques include the use of a set of colors to indicate match strength (e.g., red for strongest match intensity, shading to blue for weaker match intensities).

Any method of highlighting characters that communicates to the user a relative match strength at each displayed character position falls within the spirit and scope of this invention, including but not necessarily limited to the use of colored fonts, typefaces of differing size or style, and underlining.

Regardless of the visualization techniques used, the determination of the match strength of a given character in a database record is based upon the numerical contribution made by polygraphs including that character to the total cost of the bipartite matching. The bipartite graphs computed by the F3 filter in the multistage search contain this information.

If a given database character belongs to no matching polygraphs, its match strength is zero by definition. If it belongs to one or more matching polygraphs, its match strength may be thought of as some composite function of the lengths of those polygraphs, any weighting factors assigned to them, and their graph edge displacements.

In practice, only a small number of match strengths need be discriminated for purposes of providing effective visual feedback to the user. Since the range of polygraph lengths utilized by the search method is normally 1-graphs (i.e., single characters) to 6-graphs, the preferred embodiment of the invention ignores edge displacements, and assigns a match strength to each character equal to the length of the longest matching polygraph containing that character. These six match strengths are then rendered using different color shades for displaying the character, or other highlighting techniques such as those shown in FIG. 2.

(3) Attenuation of the Effect of Polygraph Inclusion on Matching

The original multistage search method wrongly weighted matching polygraphs of different lengths when computing bipartite matchings. Since a matching 6-graph (stretch of 6 characters) is clearly more significant than a matching 3-graph or 2-graph or 1-graph (single character), the original method adopted a weighting scheme that weighted matching polygraphs in direct proportion to their length. This approach was mistaken, and frequently resulted in a poor similarity ranking. The original method overlooked the fact that the contribution of longer polygraphs to the matching is already naturally magnified due to polygraph inclusion.

FIG. 5A illustrates the meaning of polygraph inclusion. Consider two database records R1 and R2 which contain, respectively, a 4-character and a 5-character stretch in common with a query Q. Thus, R2 has one more character in common with query Q than R1. However, as illustrated in the drawing, there are actually five additional polygraphs that R2 has in common with the query, and all five of these additional polygraphs will contribute to the bipartite matching.

Hence, the effect on the overall matching of the single additional matching character in R2 is magnified by the fact that this additional character is contiguous with a stretch of other matching characters, and the magnification effect will be greater the longer the stretch of characters is. In general terms, a new matching character added to a stretch of matching characters of length N results in N+1 new matching polygraphs (assuming that N+1 still lies within the range of polygraph lengths considered for the bipartite matching). Thus, a matching stretch lengthened from 1 to 2 results in 2 new matching polygraphs (a 2-graph and a 1-graph), a matching stretch lengthened from 3 to 4 results in 4 new matching polygraphs (a 4-graph, a 3-graph, a 2-graph, and a 1-graph), etc.

This analysis shows that as the length of a stretch of matching characters increases, its contribution to the overall matching becomes very weighty, even without the application of further length-based weighting factors. In fact, in the preferred embodiment of the multistage bipartite matching filters, this contribution increases in proportion to the square of the length of the matching stretch.

In the original method, this natural weighting effect was magnified still further by a linear weighting scheme that multiplied the contribution of a polygraph by a weighting factor equal to its length. The effect of this weighting scheme was that the total contribution of a stretch of matching characters to the overall matching increased in proportion to the cube of its length.

FIG. 5B shows an example of poor match ranking under the original weighting scheme.

Record R1 contains a 5-character stretch ("phone") in common with the query "Vodaphone." Record R2 contains only a 4-character stretch in common ("Voda"). In spite of the fact that R2 is obviously more similar to the query, R1 is ranked higher, owing to the powerful effect of the longer matching character sequence.

Experiment shows that a correct polygraph-weighting scheme should not magnify the natural weighting effect due to polygraph inclusion, but instead attenuate it somewhat. The revised scheme in the present invention weights each matching polygraph in inverse proportion to its length, attenuating but not wholly canceling the naturally greater weight of longer stretches of matching characters. The weighting factor used is the polygraph length raised to a negative exponent, but other functions may be used as well. This exponent is a tunable parameter. Appropriate values for textual data are typically in the range −0.5 to −1.0.

Figure 5C:
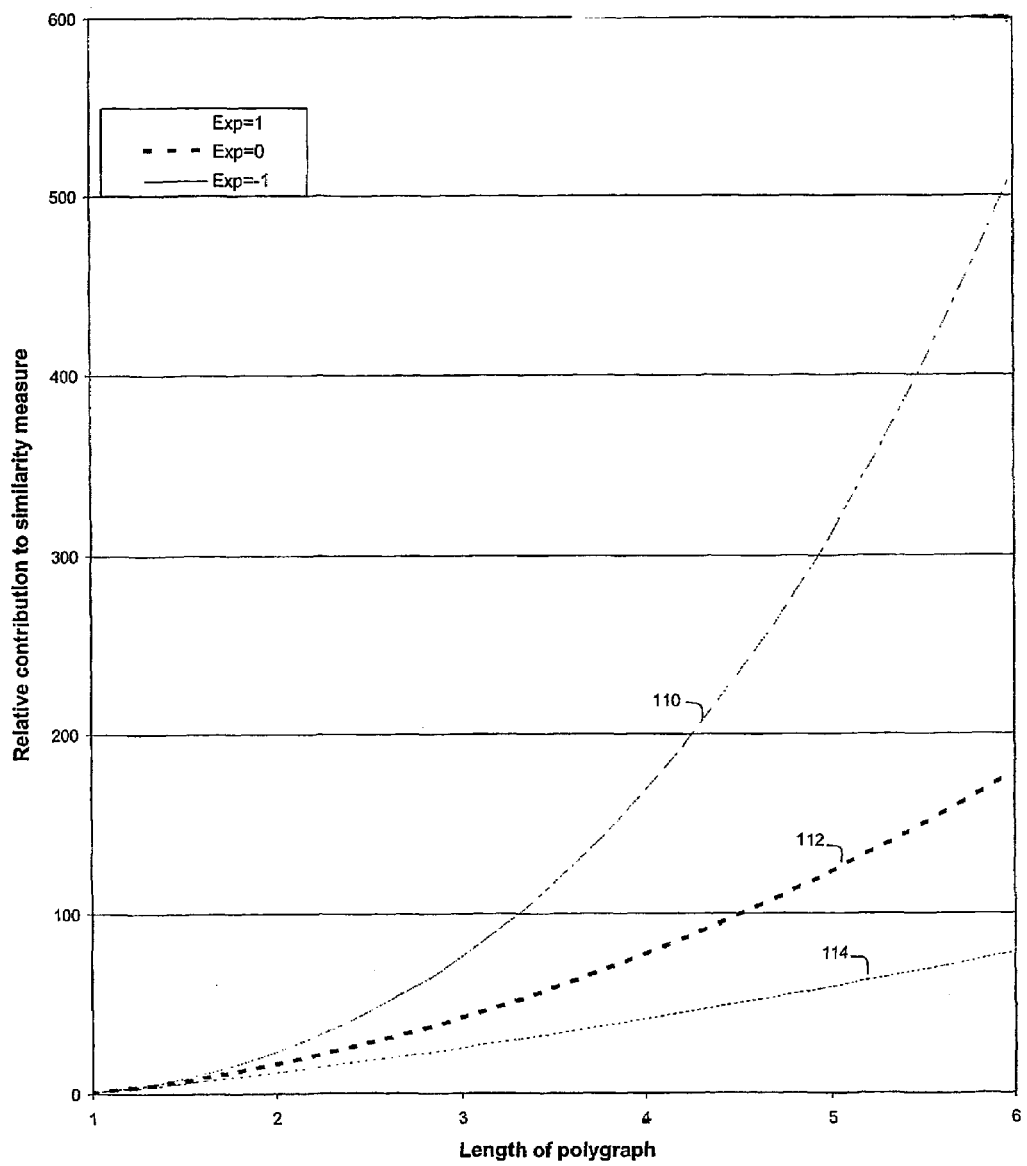
FIG. 5C is a plot of the relative contributions to the measurement of string similarity made by matching polygraphs of differing length, under several different weighting schemes.

FIG. 5C plots the relative contributions to the overall measure of string similarity by matching character stretches of lengths 1 to 6, for several different values of the exponent parameter. An exponent of 1 corresponds to the weighting scheme used in the original method. An exponent of 0 corresponds to the situation of no weighting in addition to the natural effect of polygraph inclusion. An exponent of −1 attenuates this natural effect, so that the contribution of a stretch of N matching characters increases in proportion to N log N.

The result of weighting polygraphs by their length raised to a negative exponent is that records that have many smaller matching stretches of characters, but few or no longer ones, have a better chance or ranking high in the list of matching records. This rectifies problems such as that exhibited in FIG. 5B.

(4) Phonetic Search using Transductive Preprocessing

The original multistage search method incorporated no knowledge of character phonetics. Bipartite matching operating directly on English or other natural-language strings does not capture points of similarity that depend upon knowledge of character phonetics, e.g., that in English "ph" usually represents the same sound as "f". While a typographic error in a query or database record generally substitutes an unrelated symbol for the correct one, misspellings often substitute a symbol (or symbols) that sound equivalent to the correct symbol. The original method incorporated no such language-specific phonetic knowledge, which frequently resulted in degraded search quality.

The present invention allows a query to be compared with a single database represented in more than one form, e.g., its normal human-readable form and a phonetic form. This requires that the records in a database be transformed into an alternative phonetic representation.

The transformation of a string of symbols into an alternative representation is called "string transduction." "Transductive preprocessing" is a software method that is used to prepare alternative representations of a query string or a database string, so that they can be operated on in that form by the multistage search method. The present invention employs a transductive preprocessor to enable comparison of a search query with the records in a database, based upon a phonetic transduction of both query and database records.

A phonetic transduction of the searchable portion of each database is created using an automaton that translates character strings into a phonetic alphabet. Note that this translation is not a one-to-one character mapping, since multiple letters can represent a single sound (e.g., English "th"), and a single letter can represent multiple sounds (e.g., English "x"). Further, immediate context can alter a sound (e.g., English "c", which is soft when preceding an "e" or an "i"). Such rules for transcribing character strings in a given language into a phonetic alphabet are known collectively as a "phonetic grammar," and using standard art an automaton A is created which outputs a phonetic transduction of an input string. This automaton used to preprocess every database record into its phonetic equivalent. The phonetic version of the database is precomputed and stored with the non-phonetic version.

Figure 6:
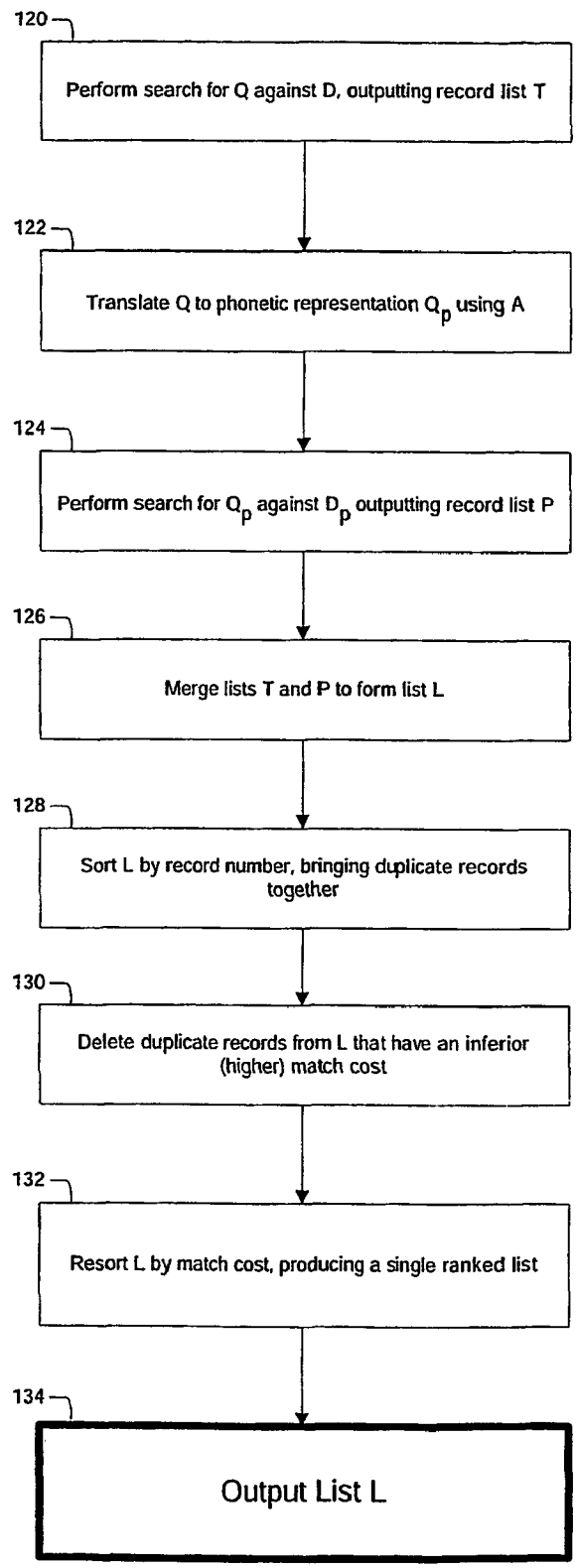
FIG. 6 is a flowchart of the operation of dual phonetic and non-phonetic database search.

FIG. 6 gives a flowchart of the operation of a dual phonetic and non-phonetic database search. When a query Q is submitted, a standard search is performed against the non-phonetic database D, returning a ranked list of matching records T 120.

Next the query Q is translated into its phonetic equivalent $Q_p$ using the same automation A that was used in the phonetic transduction of the database 122. Then a search is performed for $Q_p$ against the phonetic version of the database $D_p$, returning a ranked list of matching records P 124.

It is necessary that the matching costs of the records on lists T and P be comparable. It is sufficient for this purpose that the "padding" length used in each of the two individual searches to compensate for variations in database record lengths be the same value. This value can be set to the greater of the two padding lengths that would be used if the two searches were performed alone.

The two lists T and P are now merged into one list L 126. Since the same record can appear twice in this merged list, the merged list is processed to remove any lower-ranked duplicate records that occur. One simple method of removing duplicates is to sort L by record number 128, which brings any duplicate records together in the list. It is then easy to traverse the sorted list linearly, noting adjacent elements that represent the same record in two forms (non-phonetic and phonetic). The lower-ranking duplicate (i.e., the one with the higher match cost) is removed from the list 130. Then the list is resorted by match cost 132, producing a single duplicate-free ranked list that is the output 134.

(5) Additional Improvements to the Multistage Database Search Method 5.1 Improved Query Realignment Process The F3 filter stage aligns the left end of the query over the left end of the database record, performs a bipartite matching of letters and polygraphs, and then picks a new alignment of query and record based on the average length of the bipartite graph edges. This process is iterated, computing a new better matching in each iteration. The goal of this realignment process is to find the query-record alignment that produces the lowest-cost bipartite matching. Thus the process is iterated until it fails to produce a better matching, or until some predefined maximum number of realignments is reached.

The realignment process of the F3 filter stage in the original method does not in every case discover the globally optimal alignment of query and record. Occasionally it finds only a "local" optimum. In such a case, the F3 filter stage will underestimate the similarity of the record with the query, and will assign the record too low a rank in the list of matching records.

Figure 7A:
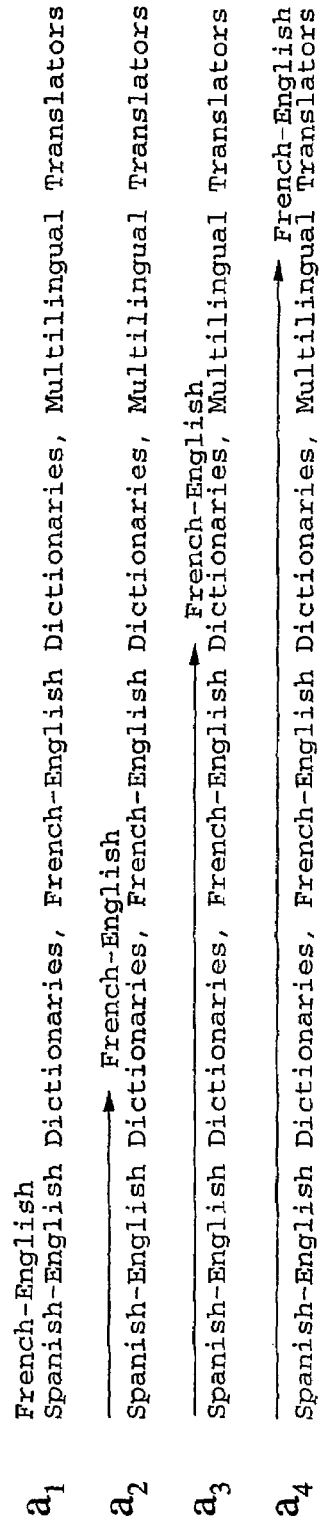
FIG. 7A illustrates a set of initial alignments of a query and a database record.
Figure 7B:
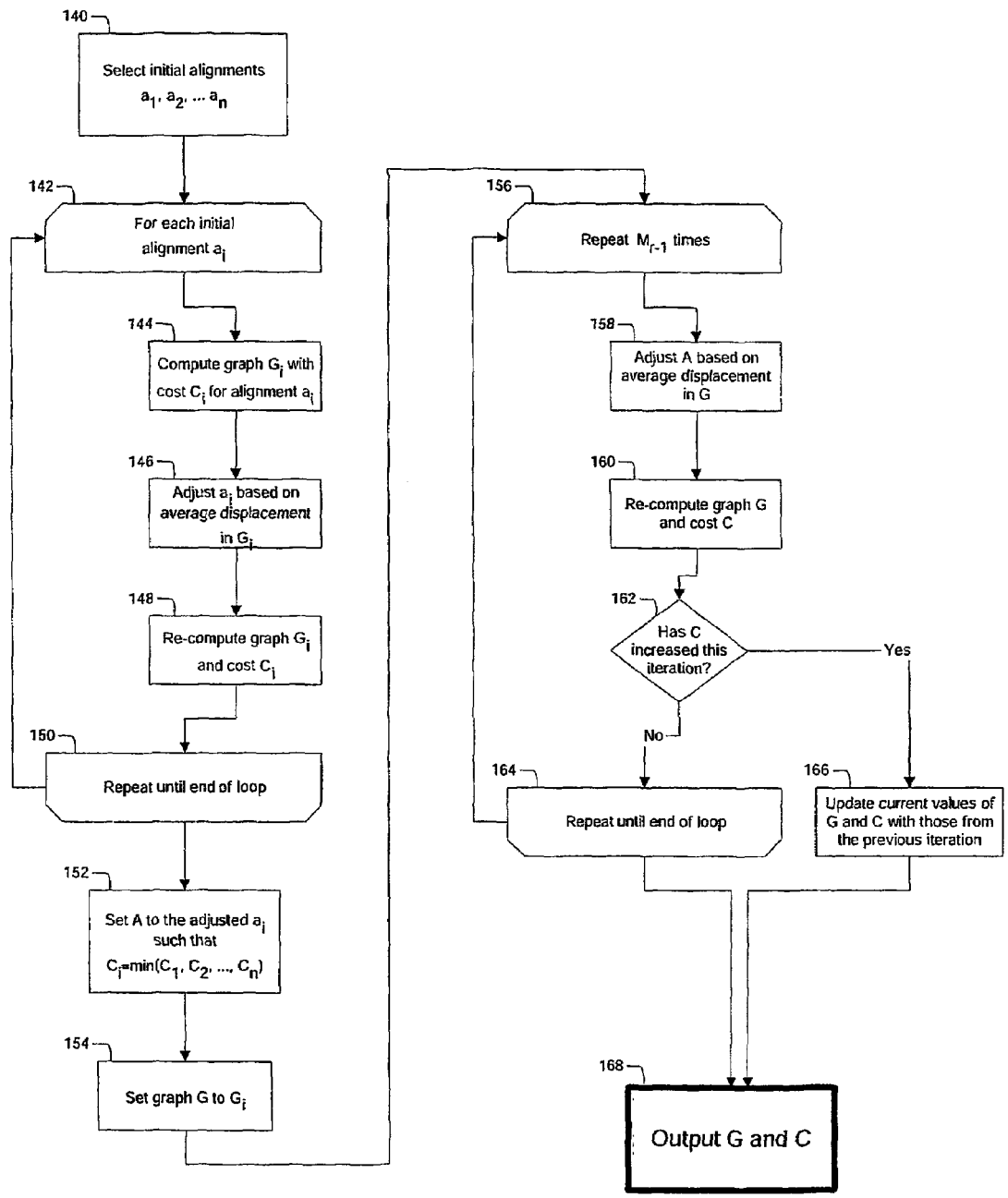
FIG. 7B is a flowchart of the improved realignment process.

FIGS. 7A and 7B illustrate the new approach to realignment in the present invention. The new F3 filter selects a number of different "initial" alignments $a_1$, $a_2$, $a_3$, . . . , including left-alignment, right-alignment, and one or more intermediate alignments of query and record 140. For each initial alignment $a_i$ 142, a small number (typically 1–2) of realignment iterations are performed, consisting of a bipartite matching producing a graph $G_i$ 144, an adjustment of the alignment by the average graph edge displacement in $G_i$ 146, and a re-computation of the bipartite matching and its graph 148. When this is completed for each initial alignment 150, the adjusted alignment A whose graph cost $C_i$ is lowest is chosen as the most promising alignment 152, along with its graph $G_i$ 154. Then the realignment iterations continue 156 with this adjusted alignment as in the prior art, until a maximum total number of realignments $M_r$ have been performed. That is, A is adjusted based on the average edge displacement in G 158, then the matching and its graph are re-computed 160. If the match cost C has not increased 162, the next iteration is allowed to proceed 164. If C has increased (i.e., gotten worse), the realignment loop exits before completing $M_r$ iterations, and the values of G and C of the previous iteration are restored 166 and output 168.

With this new approach to alignment, it is far more likely that in situations such as that depicted in FIG. 7A, the search method will discover the optimum alignment of the query over the record string. In this example, the new approach endures that at the end of the realignment process, the query "French-English" will be positioned over the most-similar middle portion of the record, rather than over the less-similar string "Spanish-English" near the beginning of the record.

5.2 Privileging of Matches Near the Beginning of a Record, and Matches of Shorter Records If two or more database records are determined to have exactly the same level of similarity to a given query, it usually males sense to favor records in which the preponderance of matching polygraphs occur earlier in the record. This is because information near the beginning of a database record is often of greater importance or relevance than information further downstream. E.g., in a list of employees, the name field is generally most "significant", and tends to precede other fields like home address and telephone number. Hence, for many applications it would make sense to privilege matches near the beginning of a record in some way. The original multistage search method did not do this.

In a similar vein, if two or more database records are determined to have exactly the same level of similarity to a given query, it usually makes sense to favor records that are shorter. This is because shorter records can be regarded as more "similar" to the query, inasmuch as they contain (by definition) fewer characters that are unmatched. The original method did not privilege shorter records in this way.

The present invention adds a final step to the F3 filter stage that promotes matches near the beginning of records, as well as shorter records. "Matches near the beginning of a record" here means: records for which the final query alignment chosen by F3 is at or close to the beginning of the record (at or close to left-alignment).

After the optimal polygraph matching has been determined between a record and the query, two small penalty values are added to the total match cost of the record. One is based on the final query alignment chosen by F3, and is called the "alignment penalty." The other is based on the record length, and is called the "record-length penalty." The total penalty added to the match cost is small enough to affect the ranking only among records that have exactly the same similarity with the query (as expressed by the match cost). The two penalty values themselves are calibrated in such a way that the alignment penalty takes precedence over the record-length penalty. In any group of output records having exactly the same total match cost, the alignment penalty will cause the records to be sorted according to query alignment. Records having both the same match cost and the same query alignment will occur adjacent to each other, and the record-length penalty will cause this subset of records to be sorted according to increasing record length. This generally results in the most natural-seeming order of records in the output list.

In order to ensure that the total penalty added to the match cost of a record does not affect the ordering of records that have different match costs, the penalties are scaled by a small value x, which is chosen to be less than the minimum possible cost difference $\Delta C_{min}$. This minimum cost difference turns out to be the minimum of the weighting factors applied for each polygraph length. For example, if the weights are calculated as described above, they are equal to the polygraph length itself raised to some negative exponent e. If the polygraphs considered are 1-graphs to 6-graphs, and the exponent e is −1, then $\Delta C_{min}$ will be ⅙=0.167.

Figure 8:
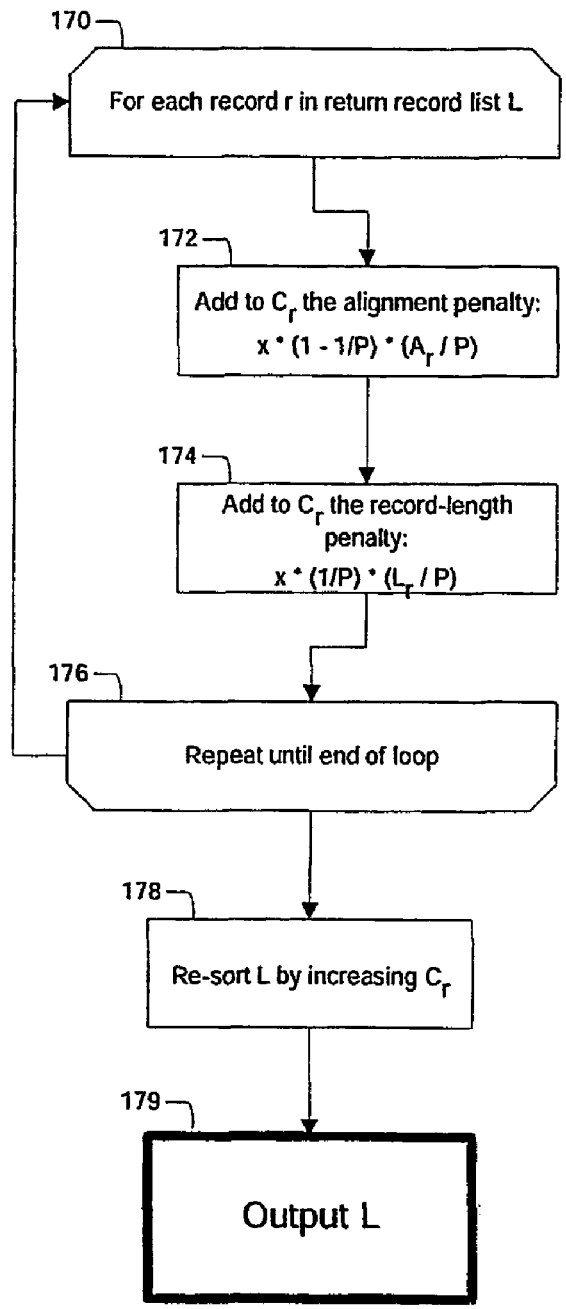
FIG. 8 is a flowchart of the penalizing of database records based on alignment and record length.

FIG. 8 is a flowchart of the operation of the postprocessor that penalizes records with respect to query alignment and record length. For each record r in the return list L 170, the alignment penalty $x*(1-1/P)*(A_r/P)$ is added to the total match cost $C_r$ 172, where x is the scaling factor discussed above, $A_r$ is the final query alignment value chosen by F3, and P is the length to which the query and all records were padded by the search (a value greater than or equal to the maximum record length plus the query length). Then the record-length penalty $x*(1/P)*(L_r/P)$ is added to $C_r$ 174, where x is the same scaling factor, $L_r$ is the length of the record, and P is the same padding length. When matching costs have been penalized for all records this way 176, the list L is re-sorted by increasing match costs 178 and output 179.

5.3 Searching Data Represented in Non-alphabetic Character Sets

Writing systems for Asian languages like Japanese are generally non-alphabetic, so it is not immediately apparent how a bipartite character-matching method for searching should be applied to data represented in an Asian or other non-alphabetic symbol set.

However, transducers exist and can be developed using standard art, that convert Asian character data into phonetic or other alphabetic equivalents. Such a transducer A can be used to preprocess a database D into an alphabetic equivalent $D_t$. The transducer A preserves a mapping between characters in the Asian language, so that it is known which alphabetic output characters correspond to which non-alphabetic input characters. This mapping need not be stored in the computer's main memory, since it is useful mainly for visualization purposes, after the ranked record list is generated.

Figure 9:
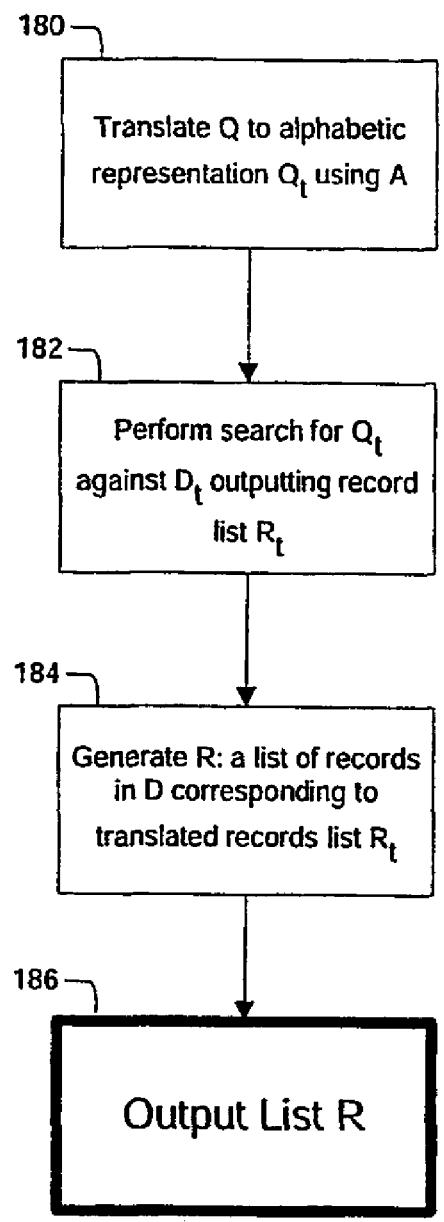
FIG. 9 is a flowchart of the operation of a database search of non-alphabetic character data.

FIG. 9 is a flowchart of the operation of a multistage database search of non-alphabetic data. A query Q expressed in a non-alphabetic character set is translated into an alphabetic equivalent $Q_t$ using the same transducer A that was used to translate $D_t$ 180. It is then compared against the alphabetic records in $D_t$, producing an output list of alphabetic records $R_t$ 182. Then the non-alphabetic versions of the records in $R_t$ are retrieved from D 184, and the resulting list R is output 186.

5.4 Postprocessing of Bipartite Graphs to Refine Match Quality

The bipartite graphs output by the F3 filter stage can be used to refine search quality, either by adjusting the contribution of certain graph edges to the total match cost of a record, or by making small alterations to the graph itself. After this graph post-processing, the match scores of output records are recalculated, resulting in possible reordering of the results list.

An example of the usefulness of such post-processing occurs with the matching of accented characters or characters with diacritics. In general, it is desirable that the multistage search method treat accented and unaccented forms of the same character as equivalent, so that a query lacking the accent will still be able to match perfectly a database record containing the query string in an accented form. Similarly, an accented query should be considered to match perfectly a record containing that string in an unaccented form. However, it often happens that both accented and unaccented versions of the same string occur in a database, and it is almost always true that accented and unaccented versions of the same character occur in a single record. In these situations, it can be desirable to penalize slightly the contributions of graph edges connecting accented with unaccented forms, or even to alter the graph edges so that a better matching is attained with respect to accents and diacritics.

Any postprocessing of bipartite graph output that adjusts the graph edge contributions to the total match cost or adjusts the graph itself for purposes of enhancing search quality, falls within the spirit and scope of this invention.

5.5 Multistage Document Search Method

The multistage method compares a query with a set of strings, which is denoted a "database" of "records." A document can be assimilated to this model if a "record" is defined to be a paragraph or other such natural document subdivision. The multistage method can then be straightforwardly applied to searching a single document for paragraphs containing a high degree of similarity to a query.

Often, documents are collected into repositories. For example, the textual component of a website can be viewed as a collection of interconnected documents, where each document is an HTML page.

The present invention adapts the multistage method for searching document collections. In this adaptation, the "database record" is a paragraph or other natural subdivision of a document. If a paragraph is excessively long, 1,000 characters being a typical threshold, it may be split into as many database records as necessary for the size of each part to fall below the threshold.

Figure 10A:
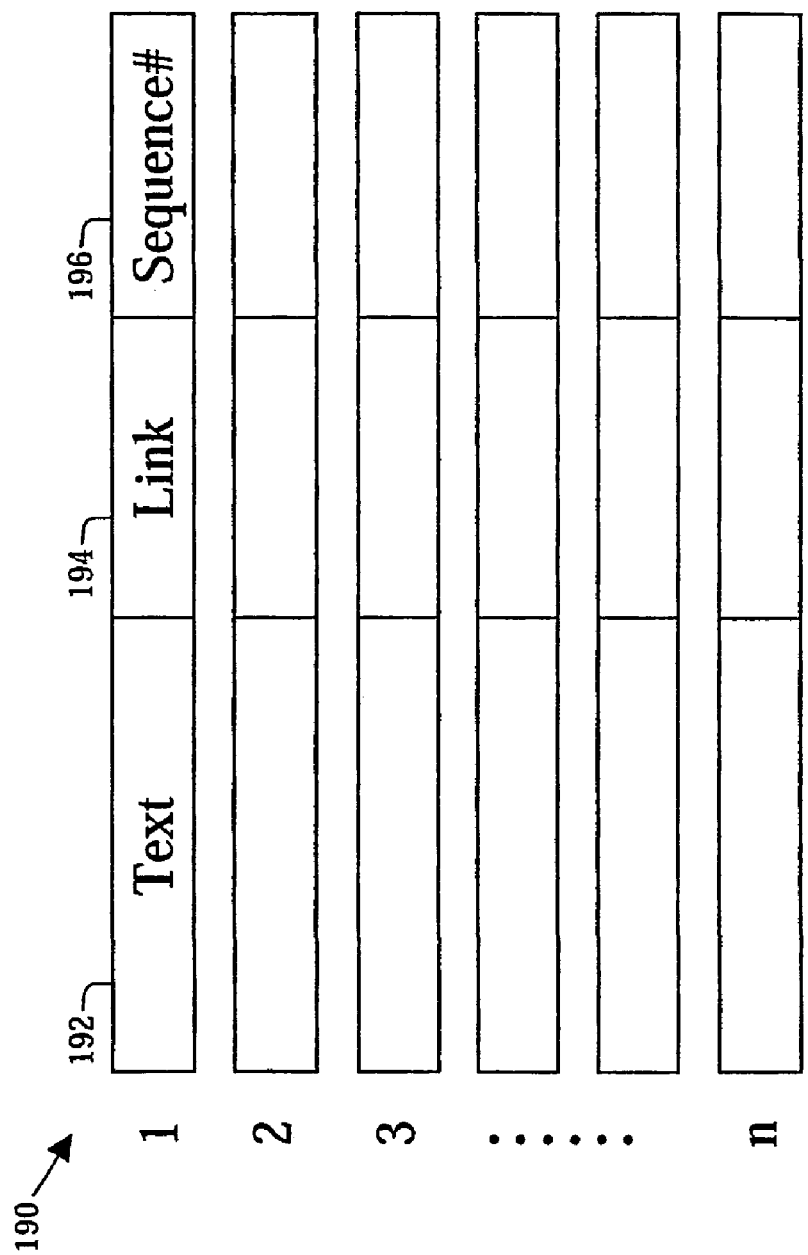
FIG. 10A is a schematic illustration of the preprocessed database structure used in a multistage document search.

FIG. 10A illustrates the internal preprocessed "database" 190 that is the complete set of paragraphs contained in all documents in the collection. The method retains the relation of these paragraph-records to the larger document of which they are parts, by storing together with the text 192 of each paragraph-record a non-searchable string 194 that "links" that paragraph-record to its source document. Typically, this non-searchable string is the web URL of the whole source document, or a lookup string that will retrieve the whole source document from a database management system. The sequence number 196 of the paragraph-record in the source document is also stored with the paragraph-record.

Figure 10B:
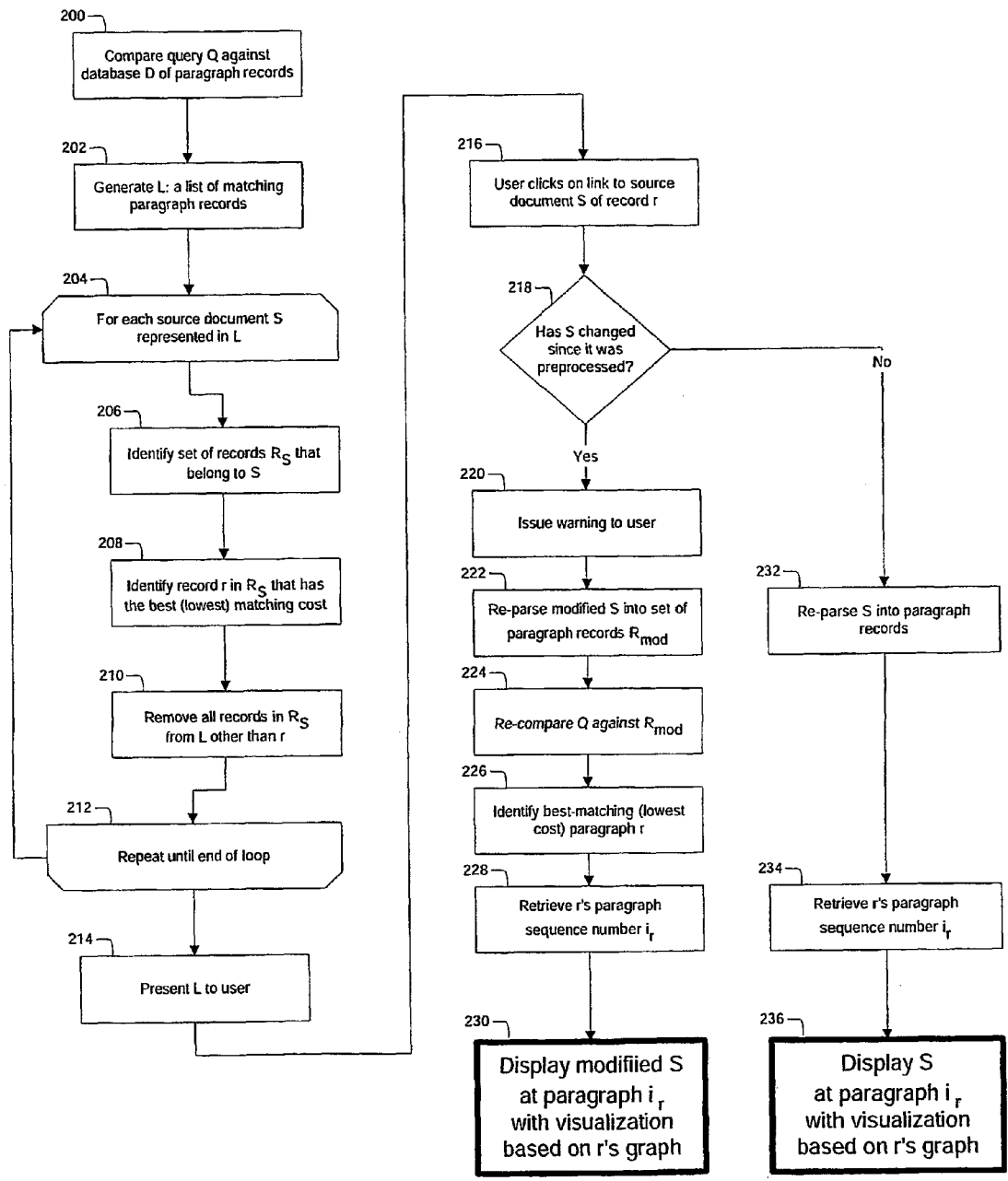
FIG. 10B is a flowchart of the operation of multistage document search.

FIG. 10B illustrates the operation of multistage document search. A query Q is compared against a database of D paragraph-records according to the preferred embodiment of the invention 200. The output is a ranked list L of paragraph-records, together with the links to their source documents and their sequence numbers in those documents 202. Paragraph-records in L originating from the same source document are now reduced to the highest-ranking paragraph, as follows. For each source document S represented in L 204, the subset of records $R_s$ in L that belong to S is identified 206. Then the highest-ranking (lowest-cost) record r in this subset is identified 208, and all other records in $R_s$ are removed from L, preserving the order of all remaining records in L 210. When all source documents represented in L have been processed in this way 212, the resulting list L of paragraphs is displayed to the user, together with active links to the source documents 214.

Thus the results list presented by the multistage document search is actually a list of documents, each represented by one salient matching paragraph. When the list search is presented to the user (in the usual case via a web interface), the user sees not only the salient matching paragraphs with matching characters highlighted, but also links to the whole source document. Clicking on a link 216 associated with a paragraph-record r takes the user to its source document S. The multistage document search combines visual match strength feedback with static or dynamic processing of the source document, so that the user is placed in the source document at the location of the matching paragraph-record, with the matching characters in that record highlighted.

Placing the user in the proper context in S is accomplished in two ways depending on whether S itself has changed since the time it was preprocessed into paragraph-records 218. If S has changed, a warning is issued to the user 220, since the highest-ranking paragraph in S may now be different from what he expects. The modified S is now re-parsed into paragraph-records and sequence numbers 222. The query Q is now re-compared against this set of paragraphs $R_{mod}$ 224, and the highest-ranking (lowest-cost) paragraph r in $R_{mod}$ is identified 226, and its sequence number $i_r$ is retrieved 228. Modified document S is now displayed to the user at paragraph $i_r$ 230. Visualization of character match strengths may be effected as described above, using visual highlighting based on the bipartite graph computed for r in step 224.

If S has not changed, it is re-parsed into paragraph-records and sequence numbers 232. The sequence number $i_r$ of r is retrieved 234, and document S is now displayed to the user at paragraph $i_r$ 236. Visualization of character match strengths may be effected as described above, using visual highlighting based on the bipartite graph computed for r in step 200.

While the invention has been described with reference to the preferred embodiment thereof, it will be appreciated by those of ordinary skill in the art that modifications can be made to the structure and elements of the invention without departing from the spirit and scope of the invention as a whole.

We claim:

1. A method of searching a database for a query comprising the steps of:
   (a) providing a database of strings of characters;
   (b) providing a query string;
   (c) identifying polygraphs that occur in said query string and also in said database strings;
   (d) providing a match cost to each said identified polygraph, and weighting the polygraphs match costs in inverse proportion to the length of the polygraph;
   (e) positioning the query string relative to each database string;
   (f) matching polygraph occurrences in the query string with those in each database string, the cost of matching providing a numerical indication of the similarity between said query string and each said database string, and the match cost attenuating the effects of polygraph inclusion on the matching step;
   (g) realigning said query string to reduce the match cost by examining edges present in a matching solution;
   (h) repeating said matching step (f) and said realigning step (g) a predetermined number of times or until the match cost fails to improve;
   (i) repeating the steps (c) to (h) above for each database string for the purpose of identifying those database strings most similar to said query string;
   (j) computing a match strength of each character in each database string based upon the match cost of each matching polygraph that includes that character; and,
   (k) displaying the database strings most similar to the query string using highlighting techniques to visually represent relative match strengths of database characters.

2. A method of searching a database for a query as set forth in claim 1 in which steps (e) through (g) are performed a minimal number of times for each alignment in a set of initial alignment positions, which may include left-alignment, right-alignment, and a number of intermediate alaignment points, and in which step (h) is replaced by identifying the initial alignment which has produced the best matching so far obtained, and repeating steps (e) through (g) for this initial alignment a predetermined number of times, or until the match cost fails to improve.

3. A method of searching a database for a query as set forth in claim 2 in which matched database strings are penalized in proportion to the departure from left-alignment of the query alignment that produces the best matching.

4. A method of searching a database for a query as set forth in claim 3 in which matched database strings are penalized in proportion to their length.

5. A method of searching a database for a query as set forth in claim 4 further comprising the step of post-processing of the matchings computed for each database string in order to improve match quality, either by adjusting the contribution of some graph edges to the total match cost of a database string, or by making any other adjustments or alterations to a bipartite graph.

6. A method of searching a database for a query as set forth in claim 5 further comprising a prefilter means for operating on a pre-computed index of polygraphs to eliminate database strings from further consideration.

7. A method of searching a database for a query as set forth in claim 6 further comprising the step of operating on a pre-computed index of all polygraphs of a fixed length N, wherein each index entry is a list of all strings in the database that contain a particular N-graph.

8. A method of searching a database for a query as set forth in claim 7 in which said prefilter means retrieves database strings from the index lists one list at a time, traversing the lists in order of increasing list length.

9. A method of searching a database for a query as set forth in claim 8 in which said prefilter means retrieves database strings from the index lists in such a way as to keep track of how many distinct N-graphs each retrieved database string has in common with the query, returning preferentially those strings having the most N-graphs in common with the query.

10. A method of searching a database for a query as set forth in claim 5 comprising the step of performing a search on a transduced version of the database using a transduced version of the query; or two parallel searches on transduced and non-transduced versions of the database using transduced and non-transduced versions of the query respectively, with the results of the two searches being merged.

11. A method of searching a database for a query as set forth in claim 10 further comprising the step of identifying database strings occurring more than once in the merged output list and removing all occurrences but the most similar occurrence.

12. A method of searching a database for a query as set forth in claim 11 in which the transductive preprocessing applied to query string and database strings produces a phonetic transcription of the query and the database.

13. A method of searching as set forth in claim 11 further comprising searching non-alphabetic textual data by applying transductive preprocessing to database strings and query string that transforms non-alphabetic text into an alphabetic equivalent.

14. A method of searching a database for a query as set forth in claim 5 where said database strings are paragraphs or other natural subdivisions of the documents in a document collection, and where the relation of each paragraph to its source document is preserved by associating with each paragraph a pointer or link to the source document, and the sequence number of the paragraph in the source document.

15. A method of searching a database for a query as set forth in claim 14, in which the output is a list of matching links to source documents, together with the paragraph in the document that is most similar to the query, or the paragraph or paragraphs that are deemed most significant based on matching costs and/or relative location and distribution within the source document.

16. A method of searching a database for a query as set forth in claim 15 which re-parses source documents and/or re-compares them with a query, such that when a user views the source document, said user is placed automatically at the position of a matching paragraph.

17. A method of searching a database as set forth in claim 1 where the highlighting techniques visually represent to the user the relative match strengths of the bipartite graph of database characters, the highlighting techniques comprising colored fonts, typefaces of differing size, typefaces of differing style, and underlining.

* * * * *